United States Patent [19]

Kaku et al.

[11] Patent Number: 4,879,703
[45] Date of Patent: Nov. 7, 1989

[54] MAGNETO-OPTIC MEMORY APPARATUS WITH DEFECT DETECTION OF RECORDING MEDIUM DURING ERASING OPERATION

[75] Inventors: Toshimitsu Kaku, Sagamihara; Yoshito Tsunoda, Mitaka; Kazuo Shigematsu, Saitama, all of Japan

[73] Assignee: Hitachi, Ltd., Tokyo, Japan

[21] Appl. No.: 71,178

[22] Filed: Jul. 8, 1987

[30] Foreign Application Priority Data

Jul. 9, 1986 [JP] Japan ................. 61-159608

[51] Int. Cl.⁴ .......................................... G11B 11/12
[52] U.S. Cl. ........................ 369/13; 369/54; 369/58
[58] Field of Search ............ 369/13, 45, 54, 44, 369/58, 46, 47, 48; 365/122; 360/114, 59

[56] References Cited

U.S. PATENT DOCUMENTS

| | | | |
|---|---|---|---|
| 4,370,679 | 1/1983 | Ceshkovsky et al. | 369/124 |
| 4,414,655 | 11/1983 | Shoji et al. | 369/58 |
| 4,638,472 | 1/1987 | Ogata et al. | 369/54 |
| 4,691,308 | 9/1987 | Takagi et al. | 369/13 |
| 4,719,612 | 1/1988 | Kenjyo | 369/54 |
| 4,730,289 | 3/1988 | Saitoh et al. | 369/13 |
| 4,733,385 | 3/1988 | Henmi et al. | 365/122 |
| 4,742,505 | 5/1988 | Takeuchi et al. | 369/45 |

FOREIGN PATENT DOCUMENTS

| | | | |
|---|---|---|---|
| 55-113137 | 9/1980 | Japan | 369/54 |
| 57-64334 | 4/1982 | Japan | 369/54 |
| 57-94906 | 6/1982 | Japan | 369/13 |
| 60-59539 | 4/1985 | Japan | 369/54 |
| 60-129954 | 7/1985 | Japan | 369/13 |

OTHER PUBLICATIONS

Ojima et al., "Compact Magneto Optical Disk for Coded Data Storage", Applied Optics, vol. 25, No. 4, 2/15/86, pp. 483–489.

Primary Examiner—Alan Faber
Assistant Examiner—Hoa T. Nguyen
Attorney, Agent, or Firm—Antonelli, Terry & Wands

[57] ABSTRACT

A magneto-optic memory apparatus is disclosed in which a laser beam is focused on a recording medium having a perpendicularly-magnetized film, the intensity of said laser beam is caused to correspond to reproducing, recording and erasing operations, an external magnetic field is applied to the recording medium at least in recording and erasing periods so that the magnetic field in the recording period is opposite in direction to the magnetic field in the erasing period, a light quantity signal corresponding to the light quantity reflected from the recording medium and a magnetization signal corresponding to data recorded on the recording medium are produced by using the reflected light from the recording medium, at least one of the light quantity signal and the magnetization is amplified by a variable gain amplifier so that an amplified value in the erasing period is nearly equal to an amplified value in the reproducing period, a defect on the recording medium is detected from the output of the variable gain amplifier in the erasing period, and defect information thus obtained is utilized to record data in a non-defective region of the recording medium.

14 Claims, 3 Drawing Sheets

FIG. I
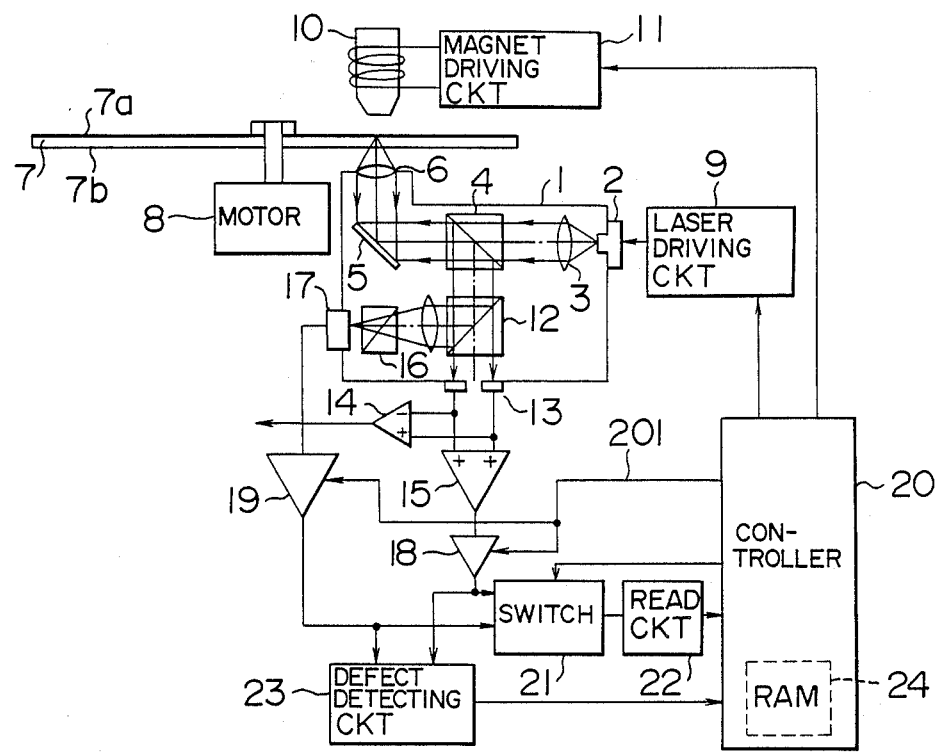
FIG. 3
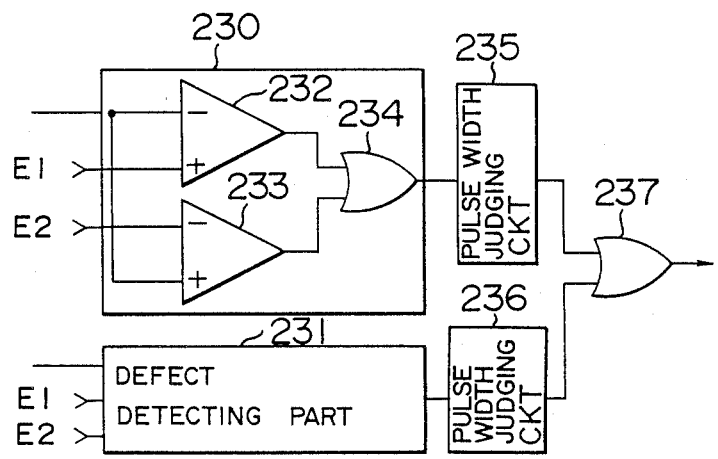

F I G. 4
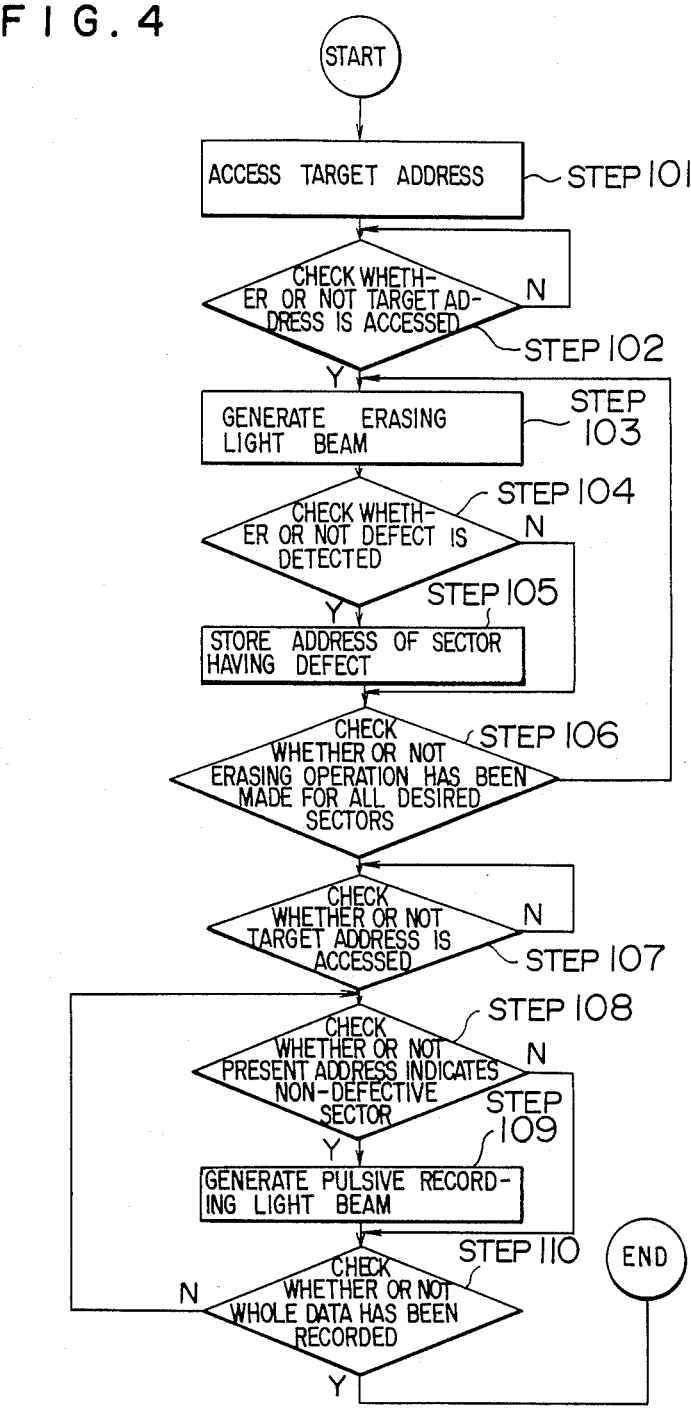

MAGNETO-OPTIC MEMORY APPARATUS WITH DEFECT DETECTION OF RECORDING MEDIUM DURING ERASING OPERATION

BACKGROUND OF THE INVENTION

The present invention relates to a magneto-optic memory apparatus capable of recording, reproducing and erasing information, and more particularly to a magneto-optic memory apparatus which is provided with a defect detector to improve the reliability of recorded data and increase the transfer rate.

A magneto-optic memory apparatus such as a magneto-optic disk apparatus can record, reproduce and erase information, and can be used in place of a large-storage capacity magnetic memory apparatus. In the magneto-optic memory apparatus, however, it is required to make the direction of magnetic field applied to a recording medium in a recording operation opposite to the direction of magnetic field applied in an erasing operation, and it takes time to reverse the direction of applied magnetic field. Usually, each of the recording and erasing operations is performed in such a manner that a magnetic field is applied to a recording medium in a direction corresponding to the recording or erasing operation, and the recording medium is irradiated with a light beam modulated in accordance with the recording or erasing operation. The above method is called the light modulating method. The operations of this kind are described in, for example, Applied Optics, Vol. 25, No. 4, 1986, pages 483 to 489, and U.S. Pat. application Ser. No. 743,974. A magnetic memory apparatus has an overwrite function, that is, a function of erasing recorded information by writing new information on a track which contains the recorded information. However, a magneto-optic memory apparatus according to the light modulating method does not have the write-over function. Hence, in order to record new information, it is necessary to perform three operations, that is, an erasing operation for erasing information which has been recorded in a region where new information is to be recorded, a recording operation for recording the new information in the above region, and an RAW operation (namely, read-after-write operation) for checking the state of information recorded by the recording operation. In other words, in order to record information, it is required to perform the erasing, recording and RAW operations for the same recording region. The fact that three operations are required to record information, makes it difficult to increase the transfer rate of the magneto-optic memory apparatus.

SUMMARY OF THE INVENTION

It is an object of the present invention to provide a magneto-optic memory apparatus which can reduce the number of operations required for recording information, thereby increasing an effective recording speed.

It is another object of the present invention to provide a magneto-optic memory apparatus which can detect a defect on a recording medium, thereby improving the reliability of recorded data.

In order to attain the above objects, according to the present invention, there is provided a magneto-optic memory apparatus, in which a recording medium is irradiated with light having a constant intensity in an erasing operation prior to a recording operation, to detect a defect on the recording medium by using the reflected light from the recording medium, and a position where data is to be recorded, is selected on the basis of the above defect information so that data is recorded in a non-defective portion, to enhance the reliability of recorded data and to dispense with the RAW operation.

BRIEF DESCRIPTION OF THE DRAWINGS

FIG. 1 is a block diagram showing an embodiment of a magneto-optic memory apparatus according to the present invention.

FIG. 3 is a block diagram showing an example of the defect detecting circuit of FIG. 1.

FIG. 4 is a flow chart for explaining the operation of the embodiment of FIG. 1.

DESCRIPTION OF THE PREFERRED EMBODIMENT

Figure 2:
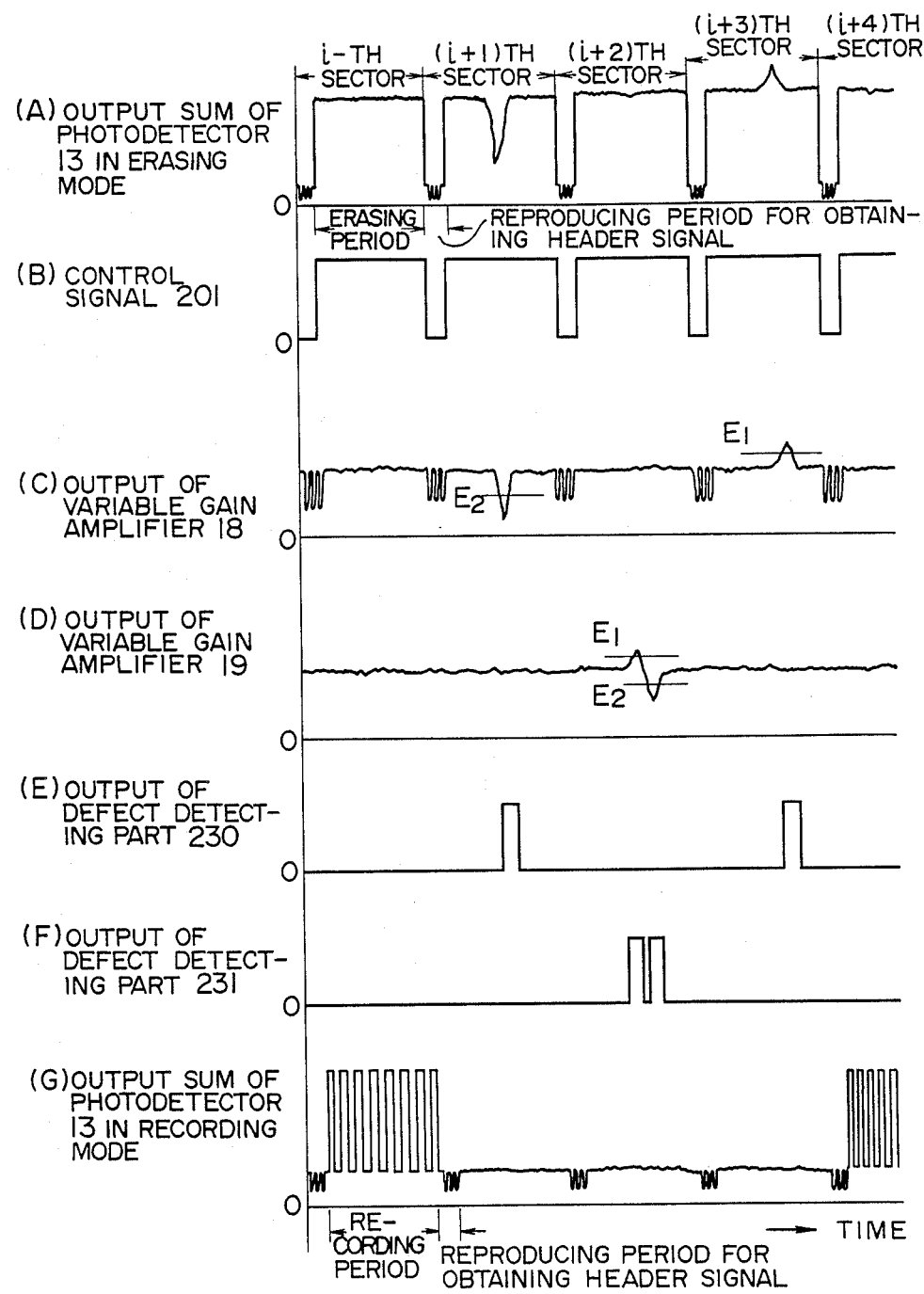
FIG. 2(a-g) are a waveforms chart for explaining the operation of the embodiment of FIG. 1.

FIG. 1 shows the construction of a embodiment of a magneto-optic memory apparatus according to the present invention. Referring to FIG. 1, an optical head 1 includes a semiconductor laser 2 serving as a light source, an illuminating optical system for guiding a laser beam from the semiconductor laser 2 to focus the laser beam on a recording medium 7, a detection optical system for taking out light which is reflected from the recording medium 7, separately from the illuminating light, and photodetector means for receiving the reflected light taken out by the detection optical system. Further, the optical head 1 is provided movably in a radial direction of the recording medium. The laser beam emitted from the semiconductor laser 2 is collimated by a coupling lens 3, and then impinges upon the recording medium 7 through a prism 4, a reflecting mirror 5 and a focusing lens 6 so that a fine light spot is formed on the recording medium 7 by the focusing lens 6. The recording medium 7 is made up of a transparent substrate 7b, a perpendicular magnetic film (that is, a perpendicularly magnetized film) 7a and a protective film (not shown), and is rotated by a motor 8. The laser beam from the optical head 1 passes through the transparent substrate 7b and is then focused on the perpendicular magnetic film 7a. The semiconductor laser 2 is controlled by a laser driving circuit 9 so as to emit the laser beam having intensities corresponding to reproducing, recording and erasing operations. For example, in a reproducing period, the semiconductor laser 2 is driven so that the laser beam has a constant power of about 1 mW at the perpendicular magnetic film 7a. In an erasing period, the laser 2 is driven so that the laser beam has a constant power of 5 to 10 mW at the magnetic film 7a. While, in a recording period, the laser 2 emits a pulse laser beam with a high power of 5 to 10 mW at the magnetic film 7a, in accordance with recording data. An electromagnet 10 for determining the direction of magnetization in the magnetic film 7a is operated so that the direction of magnetic field generated in the erasing period is opposite to the direction of magnetic field generated in the recording period. For example, the electromagnet 10 is controlled by a magnet driving circuit 11 so that a portion of the magnetic film 7a which has been irradiated with the laser beam, is upwardly magnetized in the erasing period and is downwardly magnetized in the recording period. In the reproducing period, an external magnetic field having the same direction as in the erasing or recording period is applied to the magnetic film 7a, or no magnetic field is applied thereto. Data is recorded in a desired portion of the magnetic film in such a manner that the desired portion is irradiated with the high-power, pulsive laser beam corresponding to recording data, and is magnetized by the electromagnet 10 in a direction opposite to the direction of magnetization in a surrounding area. Further, the recorded data can be erased from the above portion in such a manner that the portion is irradiated with the high-power, constant laser beam and is then magnetized by the electromagnet 10 in the same direction as the direction of magnetization in the surrounding area. The recorded data is reproduced by utilizing the Kerr effect. The term "Kerr effect" indicates a phenomenon that when linearly-polarized light is incident on a magnetic film, the plane of polarization of reflected light from the magnetic film is rotated only a little in opposite directions depending upon whether the magnetic film is magnetized upwardly or downwardly.

Referring back to FIG. 1, the reflected light from the recording medium 7 passes through the focusing lens 6, is reflected from the mirror 5, and is then separated from the illuminating light by the prism 4. The reflected light separated from the illuminating light impinges on a beam splitter 12. Light having passed through the beam splitter 12 is used for generating servo signals such as a focussing signal (focus error signal) and a tracking signal. For example, the light having passed through the beam splitter 12 is received by a two-divided photodetector 13, and the tracking signal is given by the output of a differential amplifier 14 which is applied with two outputs of the photodetector 13. Further, a light quantity signal whose level is proportional to the light quantity reflected from the recording medium 7 (for example, a header signal indicative of a sector mark, address information, and others) is given by the output of a summation amplifier 15 which is applied with the outputs of the photodetector 13. A circuit configuration for obtaining the focussing signal is omitted for brevity's sake. On the other hand, light reflected from the beam splitter 12 is used for generating a magneto-optic signal. For example, the above light is received by a photodetector 17 through an analyzer 16 to generate the magneto-optic signal. In more detail, the plane of polarization of the reflected light from the recording medium is rotated by the Kerr effect, and this rotation is converted by the analyzer 16 into a change in light quantity, which change is detected by the photodetector 17. Alternatively, the rotation of the plane of polarization due to the Kerr effect may be detected in such a manner that a halfwave plate and a polarizing prism are used for the reflected light, and the difference in light quantity between two light beams separated by the polarizing prism is measured. This method is not inferior to the method using the analyzer 16. Recording processing is carried out in the following manner. Magnetization information in a region (namely, a magnetic recording region in a sector or track) specified by an upper controller (not shown) is first erased by the erasing operation, and then new data (that is, new magnetization informtion) is recorded in the above region. According to the present invention, in the erasing operation, a magnetic recording region in a track on the recording medium is irradiated with the high-power, constant laser beam, the reflected light from the track is used for detecting a defect on the track, and the position of the defect (for example, the address of a defective sector) is stored in a memory. Further, in the recording operation, data is recorded in a sector having an address other than the stored address (that is, a non-defective sector).

The detection of a defect in the erasing operation will first be explained, with reference to FIG. 2

In the erasing period, the semiconductor laser 2 emits the high-power, constant laser beam for each sector, and hence the su of the outputs of the two-divided photodetector 13 and the output of the photodetector 17 are five to ten times larger than those in the reproducing period, as shown in part (A) of FIG. 2. If the sum of the outputs of the photodetector 13 and the output of the photodetector 17 are applied to ordinary amplifiers, the amplifiers will be saturated and perform a malfunction in the erasing period. In order to make the amplified value of the output sum of the photodetector 13 and the amplified value of the output of the photodetector 17 in the erasing period nearly equal to those in the reproducing period, the output sum of the photodetector 13 and the output of the photodetector 17 are applied to variable gain amplifiers 18 and 19, respectively, and the gain of each of the amplifiers 18 and 19 is put to a low level in the erasing and recording periods by a control signal 201 from a controller 20. Part (B) of FIG. 2 shows the control signal 201, and parts (C) and (D) of FIG. 2 show the outputs of the variable gain amplifiers 18 and 19, respectively. Alternatively, the control signal 201 may be generated in accordance with the output of a photodetector which is not shown in FIG. 2 but is disposed behind the semiconductor laser 2 to control the output power of the laser 2 on the basis of the output of the photodetector. Further, the control signal 201 may be generated in accordance with the output of a photodetector (not shown) disposed on the optical path of light which is reflected from the prism 4 when the laser beam from the semiconductor laser 2 impinges on the prism 4 through the lens 3.

The outputs of the variable gain amplifiers 18 and 19 are alternately selected by an analog switch 21, to extract a header signal portion and a magnetization signal portion (namely, data signal portion) from the outputs of the amplifiers 18 and 19, respectively. The header signal portion and the magnetization signal portion are combined, and then applied to a read circuit 22. The outputs of the variable gain amplifiers 18 and 19 are also applied to a defect detecting circuit 23.

The read circuit 22 converts the combined analog signal into a digital signal, which is sent to the controller 22. In the reproducing operation, not only the header signal containing address information and others but also the data signal is utilized. In the erasing operation, only the header signal is utilized. The defect detecting circuit 23 includes two similar circuit parts, one of which is used for detecting a defect from the light quantity signal whose level is proportional to the light quantity reflected from the recording medium 7 such as the header signal, and the other circuit part is used for detecting a defect from the magneto-optic signal. In a case where the magneto-optic signal (that is, magnetization signal) is generated on the basis of the difference in light quantity between two light beams separated by the polarizing prism, a defect corresponding to a change in reflected light quantity cannot be detected from two outputs of a photodetector for obtaining the magneto-optic signal. Accordingly, the circuit part for detecting a defect from the light quantity signal is additionally provided. This circuit part can also detect a defect in the header portion.

FIG. 3 shows an example of the defect detecting circuit 23. A defect whose level is higher than a reference level $E_1$ is detected by the comparator 232, and a defect whose level is lower than another reference level $E_2$ is detected by the comparator 233. The outputs of the comparators 232 and 233 are applied to an OR circuit 234, to obtain the logical sum of the above outputs. The outputs of the defect detecting parts 230 and 231 are shown in parts (E) and (F) of FIG. 2, respectively.

The defect detected from the light quantity signal is caused by that portion of the magnetic film which is abnormal in reflectivity, and the defect detected from the magneto-optic signal is caused by that portion of the magnetic film which is abnormal in magnetic characteristics. In the case of FIG. 2, the defect due to the abnormal reflectivity is found in the (i+1)th and (i+3)th sectors, and the defect due to the abnormal magnetic characteristics is found in the (i+2)th sector.

Usually, recording data are separately arranged in the data area of sector in accordance with the interleaving method. The data contains ECC (namely, error detection and correction code) for correcting an error. Each sector contains a synchronizing signal portion, in addition to the data area. The ECC can correct a burst error of the order of 30 bytes. Each of pulse width judging circuits 235 and 236 shown in FIG. 3 judges whether or not a defect is based upon a burst error incapable of being corrected by the ECC. In a case where the defect cannot be corrected by the ECC, each of the pulse width judging circuits 235 and 236 delivers a defect detection signal. The defect detection signal obtained from the light quantity signal and the defect detection signal obtained from the magneto-optic signal are applied to an OR circuit 237, to obtain the logical sum of these defect detection signals. The output of the OR circuit 237 is sent to a defect storing circuit (that is, a random access memory RAM) 24 included in the controller 20. That is, the position (that is, address) of a defect which cannot be corrected by the ECC, is stored in the RAM 24.

In the present embodiment, the header signal containing address information and others is taken out in a reproducing period prior to an erasing period. Accordingly, the sector number which is obtained at a time the defect detection signal is delivered from the defect detecting circuit 23, can be written in the RAM 24. Thus, the position of a defect is stored in the RAM 24. In the case of FIG. 2, each of the (i+)th, (i+2)th and (i+3)th sectors is recorded as the defective sector. In the recording operation (mode), data is recorded in a non-defective region, on the basis of the contents of the RAM 24.

Now, the above-mentioned operation of the present embodiment will be explained by using the flow chart of FIG. 4. Let us consider a case where the erasing operation and the recording operation are performed for every N tracks (where N is an integer greater than one) to record data in the tracks, for convenience' sake. In order to carry out recording processing, it is necessary to perform the erasing operation at first. Accordingly, a positioning operation (access) for accurately locating the optical head 1 in relation to a target address is started by a command from the upper controller (step 101). When the optical head 1 is roughly located in relation to the target address, the semiconductor laser 2 is driven in the reproducing mode by the laser driving circuit, to obtain a header signal, thereby checking whether or not the optical head 1 is accurately located in relation to the target address (step 102). When the optical head 1 is accurately located, the electromagnet 10 is so driven by the magnet driving circuit 11 as to generate the magnetic field corresponding to the erasing operation, and the semiconductor laser 2 is driven in the erasing mode by the laser driving circuit 9 to emit an erasing light beam for each sector (step 103). Light reflected from the recording medium at a time the erasing light beam is incident on the recording medium, is used for detecting a defect, and the defect detection is made by the defect detecting circuit 23 (step 104). At this time, the gain of each of the variable gain amplifiers 18 and 19 is controlled by the control signal 201 so that the amplified value of the output sum of the photodetector 13 and the amplified value of the output of the photodetector 17 become nearly equal to those in the reproducing period. When no defect is detected, it is checked whether or not the erasing operation for all desired tracks (or sectors) has been completed, and the erasing operation is continued till all the desired tracks (or sectors) are subjected to the erasing operation (step 106). When a defect is detected, the address of a sector which has the defect, is stored in the RAM 24 (step 105). After the above operations have been performed for N tracks, the recording operation is started. At first, the semiconductor laser 2 is driven in the reproducing mode to obtain the header signal, and it is checked whether or not the optical head 1 is accurately located in relation to a target address. When the optical head 1 is not accurately located, the light spot is placed accurately on the target address by the positioning operation (step 107). When the light spot is placed on the target address, the electromagnet 10 is driven by the magnet driving circuit 11 so as to generate the magnetic field corresponding to the recording operation, and the present address where data is to be recorded, is compared with addresses stored in the RAM 24 (step 108). When the present address does not agree with any one of the addresses stored in the RAM 24, the semiconductor laser 2 is driven by the laser driving 9 in accordance with recording data, to generate the pulsive recording light beam, thereby recording magnetization information (step 109). When the present address agrees with one of the addresses stored in the RAM 24, the recording operation for the present address is stoped, and the recording operation is performed for the next address (step 110). Accordingly, in the case of FIG. 2, magnetization information is recorded in the i-th and (i+4)th sectors as shown in part (G) of FIG. 2.

In the above explanation, a defect is detected from each of the light quantity signal and the magneto-optic signal. However, a defect may be detected from one of these signals taking into consideration the kind of defect and the reliability of recorded data. Further, when an initial defect is detected immediately after a magneto-optic disk has been fabricated, and the defect information is stored in a control area of the disk, the reliability o recorded data is further improved. The control area is formed of a track group which exists in an innermost or outermost region of the recording medium 7 and is used for storing disk information (for example, the kind of magnetic film, the recording format, the recording capacity and the recording sensitivity) In a case where the defect information is stored in the control area together with the disk information, the control area is composed of about ten tracks.

As has been explained in the foregoing, according to the present invention, light reflected from a recording medium in an erasing period, is used for detecting a defect on the recording medium, and the defect information thus obtained is used for recording data only in non-defective region of the recording medium. Accordingly, the reliability of recorded data is improved, and the RAW operation becomes unnecessary, that is, the data processing speed in recording data on the recording medium is increased.

We claim:

1. A magneto-optic memory apparatus comprising:
   a recording medium having a perpendicular magnetic film;
   illumination means for focusing a laser beam on said recording medium;
   laser driving means for causing the intensity of said laser beam to correspond to a reproducing operation, a recording operation and an erasing operation;
   magnetic field generating means for applying a magnetic field to said recording medium in recording and erasing periods;
   driving means for driving said magnetic field generating means so that the magnetic field applied to said recording medium in the recording period is opposite in direction to the magnetic field applied to said recording medium in the erasing period;
   first detection means for detecting a signal indicative of a reflected light quantity, by using reflected light from said recording medium;
   second detection means for detecting a magnetization signal indicative of magnetization information recorded in said perpendicular magnetic film by using said reflected light;
   variable gain amplifying means connected to at least one of said first and second detection means, the gain of said variable gain amplifying means in a reproducing period being made different from the gain of said variable gain amplifying means in the erasing period;
   defect detecting means for detecting a defect on said recording medium on the basis of an output signal from said variable gain amplifying means during an erasing operation; and
   control means for storing the position of a detect detected by said defect detecting means, and for controlling said laser driving means on the basis of stored position information to enable proper recording of data without requiring a read after write operation.

2. A magneto-optic memory apparatus according to claim 1, wherein said variable gain amplifying means is made up of first and second variable gain amplifiers which are connected to said first and second detection means, respectively.

3. A magneto-optic memory apparatus according to claim 1, wherein said defect detecting means includes comparator means which delivers a pulse when the output signal from said variable gain amplifying means is outside a range defined by first and second predetermined values.

4. A magneto-optic memory apparatus according to claim 2, wherein said defect detecting means includes first and second comparator means which are connected to said first and second variable gain amplifiers, respectively, and wherein said first comparator means delivers a pulse when the output signal of said first variable gain amplifier is outside a range defined by first and second predetermined values, and said second comparator means delivers a pulse when the output signal of said second variable gain amplifier is outside said range.

5. A magneto-optic memory apparatus according to claim 3, wherein said defect detecting means further includes pulse width judging means connected to said comparator means for comparing the width of a pulse delivered from said comparator means with a predetermined value.

6. A magneto-optic memory apparatus according to claim 4, wherein said defect detecting means further includes first and second pulse width judging means which are connected to said first and second comparator means, respectively, and wherein said first pulse width judging means compares the width of a pulse delivered from said first comparator means with a predetermined value, and said second pulse width judging means compares the width of a pulse delivered from said second comparator means with said predetermined value.

7. A magneto-optic memory apparatus according to claim 1, wherein said recording medium has a sector structure, and said control means includes a memory for storing the address of a sector having a defect which has been detected by said defect detecting means.

8. An magneto-optic memory apparatus comprising:
   a light source;
   an optical system for leading light from said light source to a recording medium, said recording medium having a perpendicular magnetic film,
   a photodetector for receiving light reflected from said recording medium;
   magnetic field generating means for applying a magnetic field to said recording medium in recording and erasing periods;
   a variable gain amplifier for amplifying the output of said photodetector so that the amplifier value of the output of said photodetector in an erasing period becomes nearly equal to the amplified value of the output of said photodetector in a reproducing period, the intensity of light incident on said recording medium in said erasing period being made greater than the intensity of light incident on said recording medium in said reproducing period;
   a detect detector for generating a signal corresponding to a detect which appears in the output of said variable gain amplifier during an erasing period; and
   storage means for storing defect information detected by said defect detector so as to enable recording of data in a favorable region of said recording medium on the basis of the contents of said storage means without requiring a read after write operation.

9. A magneto-optic memory apparatus according to claim 8, wherein said defect detector includes a first comparator for comparing the output of said variable gain amplifier with a first predetermined value, a second comparator for comparing the output of said variable gain amplifier with a second predetermined value, and an OR circuit for obtaining the logical sum of the outputs of said first and second comparators.

10. A magneto-optic memory apparatus according to claim 9, wherein said defect detector further includes a pulse width judging circuit for comparing the width of a pulse delivered from said OR circuit with a predetermined value.

11. A magneto-optic recording method, comprising the steps of during an erasing operation carried out prior to an information recording operation, applying a magnetic field of a predetermined direction to a recording medium having a perpendicular magnetic film while illuminating said recording medium with a light beam, detecting a variation in a detection output obtained by detecting light reflected from said recording medium as a defect on said recording medium, memorizing the position of said detected defect for reference during the information recording operation so that information can be recorded on said recording medium in a region free of said defect by illuminating said medium with a light beam having intensity modulated in accordance with said information while applying to said recording medium a magnetic field of the direction opposite to that of the magnetic field applied during said erasing operation so as to enable proper recording is effected without requiring a read after write operation.

12. A magneto-optic recording method according to claim 11, wherein during said erasing operation, increasing the intensity of said light beam as compared with the intensity of the light beam employed in an information reproducing operation, controlling the level of said detection output obtained during said erasing operation so as to be substantially equal to the level of a detection output obtained in the reproducing operation, and locating said defect by defecting the variation in the detection output while controlling said level during said erasing operation.

13. A magneto-optic recording method according to claim 12, wherein a recording medium of a sector structure is employed as said recording medium, said memorization of the position of defect is effected by memorizing the address of the sector in which said detected defect is present.

14. A magneto-optic recording method according to claim 11, wherein said information includes an error detection and correction code for error correction, and wherein a defect which cannot be corrected with said error detection and correction code is determined to be the defect on said recording medium.

* * * * *